Feb. 23, 1932.   A. W. KIMBELL   1,846,737
SNAP FASTENER SOCKET
Filed April 11, 1930

Inventor:
Arthur W. Kimbell
by Emery, Booth, Varney & Townsend
Attys

Patented Feb. 23, 1932

1,846,737

UNITED STATES PATENT OFFICE

ARTHUR W. KIMBELL, OF NEWTON CENTER, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER SOCKET

Application filed April 11, 1930. Serial No. 443,336.

My invention aims to provide improvements in snap fastener sockets.

In the drawings which illustrate a preferred embodiment of my invention:—

Referring now to the embodiment of my invention illustrated by the drawings, I have shown a flush type socket which is particularly adapted for attachment to a sheet metal support.

Figure 1:
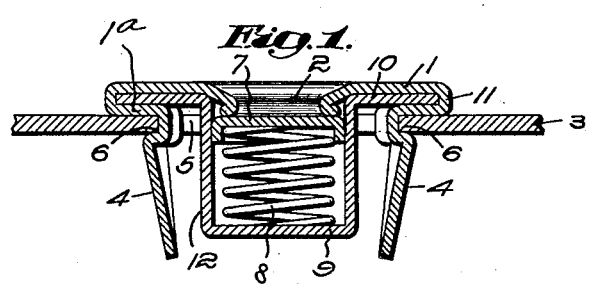
Figure 1 is a section through a fastener socket and a supporting part.

The socket comprises a sheet metal stud-engaging part 1 having a stud-receiving aperture 2. As shown in Figure 1, the part 1 is adapted to seat against the front face of a support 3 and is held in position with relation to the support by means of yieldable attaching fingers 4.

Figure 2:
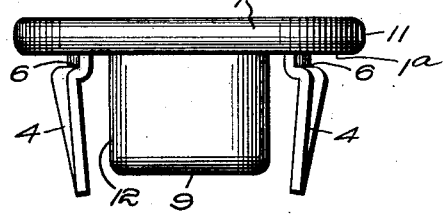
Fig. 2 is a side elevation of the socket showing the attaching means in edge elevation.
Figure 3:
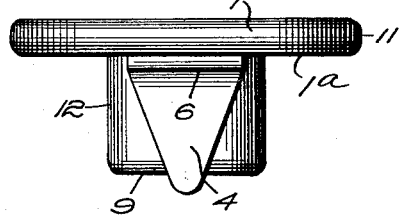
Fig. 3 is a side view of the socket showing a side view of one of the attaching members.

In the particular embodiment of my invention illustrated, the fingers 4 are two in number (Figs. 1, 2 and 3) and extend from beneath the part 1 through an aperture 5 in the support. Each finger is spaced inwardly from the periphery of the part 1 and projects from the inner edge of a flange 1ª underlying the front face portion of the part 1. By this construction the aperture 5 in the part 3 is concealed when the socket is in place. Each finger 4 is provided with an abrupt shoulder 6 which engages the inner face of the support 3, thereby locking the socket in position. The two fingers 4—4 are opposed to each other and converge toward each other, thereby to have the distance between their free ends shorter than the diameter of the aperture 5, thereby to enter that aperture easily when the socket is snapped into engagement with the support 3.

Figure 4:
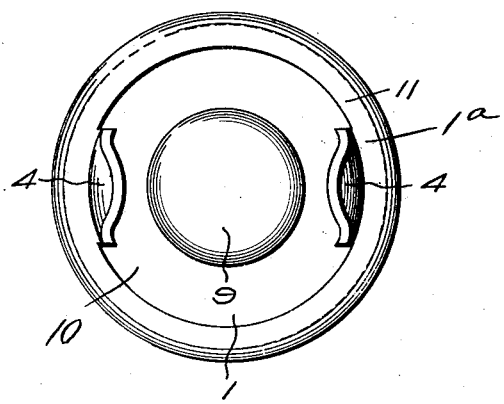
Fig. 4 is an underside view of the socket.

In order that the stud-receiving aperture 2 may be closed against the passage of dust, dirt or moisture to the interior of the supporting structure, I have provided a closure plate 7 normally pressed against the part 1 to close the aperture 2 by a spring 8, as shown in Fig. 1. The closure plate 7 and spring 8 are held in position by a cup-shaped casing part 9 having an outwardly extending flange 10 at the open end thereof. The casing part 9 is held in assembled relation to the part 1 by means of the flange 1ª (Figs. 1 and 4) which extends inwardly from the peripheral wall 11 underneath the flange 10 as illustrated. The spring pressed closure plate also acts as a "kick-out" during the separation of a stud from the socket.

The fingers 4, or attaching means extend at right angles to the general plane of the part 1 and are spaced from the outer wall 12 of the casing part 9. Thus, when the fingers 4 are pressed through the hole 5 in the support 3 they may yield toward the wall 12 without interference therefrom.

My improved socket is simple, inexpensive and durable and may be easily attached by merely pressing the fingers through an aperture in the support until the shoulders 6 snap beneath the support.

While I have illustrated and described a preferred embodiment of my invention, I do not wish to be limited thereby, because the scope of my invention is best defined in the following claims.

1. A snap fastener socket having a part provided with a stud-receiving aperture, a casing portion forming a part of said socket and located behind the part provided with the stud-receiving aperture, flange means extending laterally outwardly from the stud-receiving apertured part and the casing portion and in the plane of the stud-receiving aperture, yieldable attaching elements extending away from said flange means at the under side thereof in spaced parallel relation to said casing portion and means formed on the attaching elements for cooperation with said flange means to secure the socket to a support.

2. A snap fastener socket having a part provided with a stud-receiving aperture, a casing portion forming a part of said socket and located behind the part provided with the stud-receiving aperture, flange means extending laterally outwardly from the stud-receiving apertured part and the casing portion and in the plane of the stud-receiving aperture, yieldable attaching elements extending away from said flange means at the under side thereof in spaced parallel relation to said casing portion, means formed on the attaching elements for cooperation with said flange means to secure the socket to a support and a spring-pressed closure element located in the casing element and normally closing the stud-receiving aperture.

3. A snap fastener socket having a part provided with a stud-receiving aperture, snap-actuated attaching means formed as a part of the socket and located beneath said part for attaching it to a support, a closure plate located beneath said part, a spring beneath said closure plate normally pressing said closure plate against said part to close the stud-receiving aperture, and means spaced a substantial distance inwardly from said attaching means and extending from said part independently of and in the same direction as said attaching means and supporting said closure plate and spring.

4. A snap fastener socket having a part provided with a stud-receiving aperture, snap-actuated attaching means formed integral with and located beneath said part for attaching it to a support, a closure plate located beneath said part, a spring beneath said closure plate normally pressing said closure plate against said part to close the stud-receiving aperture, and a cup-shaped part secured to and extending from said part in the same direction as said attaching means and supporting said closure plate and spring.

5. A snap fastener socket having a part provided with a stud-receiving aperture, snap-actuated attaching means formed as a part of the socket and located beneath said part for attaching it to a support, said attaching means being in the form of two opposed fingers each having a relatively abrupt shoulder and each converging toward the other from the shoulder to the free end, a closure plate located beneath said part, a spring beneath said closure plate normally pressing said closure plate against said part to close the stud-receiving aperture, and means extending from said part in the same direction as said attaching means and supporting said closure plate and spring.

6. A snap fastener socket comprising a stud-receiving part 1 having a stud-receiving aperture 2, a cup-shaped part 9 located behind said part 1 and having a closure plate 7 contained therein and normally pressed into aperture-closing position by a spring 8, a flange 10 on said part 9 engaged and held by a flange 1ª and wall 11 at the periphery of said part 1, and opposed yieldable fingers 4—4 extending from said flange 1ª in spaced relation to said part 9 and having shoulders 6 whereby the socket is held in position when the said fingers 4—4 are pressed through an aperture in a supporting structure.

In testimony whereof, I have signed my name to this specification.

ARTHUR W. KIMBELL.